US012731854B2

(12) United States Patent
Sasaki et al.

(10) Patent No.: US 12,731,854 B2
(45) Date of Patent: Sep. 8, 2026

(54) VALVE STRUCTURE FOR POWER STORAGE DEVICE AND POWER STORAGE DEVICE

(71) Applicant: DAI NIPPON PRINTING CO., LTD., Tokyo (JP)

(72) Inventors: Miho Sasaki, Tokyo (JP); Tomohiro Sasaki, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 673 days.

(21) Appl. No.: 18/032,249

(22) PCT Filed: Oct. 15, 2021

(86) PCT No.: PCT/JP2021/038327

§ 371 (c)(1),
(2) Date: Apr. 17, 2023

(87) PCT Pub. No.: WO2022/080498

PCT Pub. Date: Apr. 21, 2022

(65) Prior Publication Data

US 2023/0395930 A1 Dec. 7, 2023

(30) Foreign Application Priority Data

Oct. 16, 2020 (JP) ................................ 2020-175038
Dec. 25, 2020 (JP) ................................ 2020-218035

(51) Int. Cl.
*H01M 50/333* (2021.01)
*H01M 50/30* (2021.01)

(52) U.S. Cl.
CPC ....... *H01M 50/333* (2021.01); *H01M 50/394* (2021.01); *H01M 2200/20* (2013.01)

(58) Field of Classification Search
CPC ............. H01M 50/333; H01M 50/394; H01M 2200/20; H01M 50/30; H01M 50/325;
(Continued)

(56) References Cited

U.S. PATENT DOCUMENTS 1,362,535 A * 12/1920 Hughes .................. F16K 13/10 137/543.13
3,398,026 A 8/1968 Henri
(Continued)

FOREIGN PATENT DOCUMENTS

CN 204855578 U 12/2015
CN 108413088 A 8/2018
(Continued)

OTHER PUBLICATIONS

"PM-50 Phenylmethyl Silicone Fluid NPL" (see https://www.clearcoproducts.com/pdf/phenyl/NP-PM-50_Phenylmethyl_Silicone_Fluid(1).pdf). (Year: 2017).*
(Continued)

*Primary Examiner* — Lisa S Park
(74) *Attorney, Agent, or Firm* — Oliff PLC

(57) ABSTRACT

A valve structure for a power storage device includes a passage that communicates the interior of a container housing a power storage device element with the exterior of the container, and a check valve disposed to block the passage and configured to open when the internal pressure of the container increases due to gas produced inside the container and pass the gas from the internal side of the container to the external side, the check valve including a valve seat and a valve body, and the valve structure including a liquid disposed to come in contact with the valve seat and the valve body.

20 Claims, 12 Drawing Sheets

(58) Field of Classification Search
CPC ........... H01M 50/342; H01M 50/3425; H01M 50/367; H01M 50/383; H01M 50/317; F16K 13/10; F16K 17/0406; F16K 15/04; F16K 17/04; Y02E 60/13; Y02E 60/10
See application file for complete search history.

(56) References Cited

U.S. PATENT DOCUMENTS

| | | | | |
|---|---|---|---|---|
| 2012/0176730 | A1* | 7/2012 | Takemura ............. | H01G 11/20 361/518 |
| 2016/0036024 | A1 | 2/2016 | Choi et al. | |
| 2017/0018748 | A1 | 1/2017 | Matsuura | |
| 2021/0249729 | A1 | 8/2021 | Mochizuki et al. | |

FOREIGN PATENT DOCUMENTS

| | | | |
|---|---|---|---|
| JP | H04-328241 | A | 11/1992 |
| JP | 2000-216068 | A | 8/2000 |
| JP | 2003-272969 | A | 9/2003 |
| JP | 2003-272971 | A | 9/2003 |
| JP | 2003272971 | * | 9/2003 |
| JP | 2010-153841 | A | 7/2010 |
| JP | 2016-31934 | A | 3/2016 |
| JP | 2017-022050 | A | 1/2017 |
| JP | 6540871 | B1 | 6/2019 |
| KR | 20150086897 | * | 7/2015 |
| KR | 10-2018-0045623 | A | 5/2018 |
| WO | WO2014/193979 | * | 12/2014 |
| WO | 2019/230743 | A1 | 12/2019 |

OTHER PUBLICATIONS

Nov. 30, 2021 International Search Report issued in International Patent Application No. PCT/JP2021/038327.

Nov. 30, 2021 Written Opinion of the International Searching Authority issued in International Patent Application No. PCT/JP2021/038327.

Jul. 5, 2024 Extended Search Report issued in European Patent Application No. 21880233.8.

Feb. 13, 2026 Office Action issued in Chinese Application No. 202180070687.4.

Nov. 20, 2025 Office Action issued in Korean Patent Application No. 10-2023-7010662.

* cited by examiner

VALVE STRUCTURE FOR POWER STORAGE DEVICE AND POWER STORAGE DEVICE

TECHNICAL FIELD

The present invention relates to a valve structure for a power storage device and a power storage device including the same.

BACKGROUND ART

Patent Document 1 discloses a battery housing a battery element in a pouch. In the pouch, a valve structure having a check valve is attached to a heat sealing part that is formed around the periphery of the pouch. This check valve is configured to operate when the internal pressure of the pouch increases to a certain level and vent gas.

Also, Patent Document 2 discloses a battery housing a battery element in a box-shaped laminated container. In this laminated container, a flange-shaped heat sealing part that is formed around the periphery of the laminated container peels off more easily in one place (hereinafter, easy peel part) than in other regions. The easy peel part peels off when the internal pressure of the laminated container increases to a certain level, and gas is vented through a hole that is formed in the middle of the easy peel part. The easy peel part is a breaker valve that does not return to its original state once it has peeled off, unlike a check valve such as described in Patent Document 1.

CITATION LIST

Patent Literature

Patent Literature 1: JP 2016-31934
Patent Literature 2: JP 2010-153841

SUMMARY OF INVENTION

Technical Problem

Incidentally, a check valve is generally a one-way valve and serves to prevent backflow. However, with a battery such as described in Patent Document 1, the battery degrades when the pouch is contaminated with even a small amount of moisture contained in the air, and thus backflow needs be prevented with a high degree of precision. Thus, it is difficult, in practice, for a check valve that vents gas produced inside a pouch such as described in Patent Document 1 to completely prevent air from infiltrating the pouch at a high level such as required for a battery. Therefore, with a battery such as described in Patent Document 1, there is a problem in that the pouch becomes contaminated with moisture contained in the air, causing the battery to degrade.

On the other hand, with a battery such as described in Patent Document 2, once the breaker valve ruptures, air infiltrates the laminated container via a passage formed by the rupture. Therefore, even in the case where a breaker valve is used such as described in Patent Document 2, there is a problem that the laminated container is contaminated with moisture contained in the air, causing the battery to degrade.

An object of the present invention is to provide a valve structure that is able to suppress infiltration of moisture into a container housing a power storage device element, and a power storage device including the same.

Solution to Problem

A valve structure for a power storage device according to a first aspect of the present invention includes a passage configured to communicate an interior of a container housing a power storage device element with an exterior of the container, and a check valve disposed to block the passage and configured to open when an internal pressure of the container increases due to gas produced inside the container and pass the gas from an internal side of the container to an external side, the check valve including a valve seat and a valve body, and the valve structure including a liquid disposed to come in contact with the valve seat and the valve body.

A valve structure for a power storage device according to a second aspect of the present invention is the valve structure for a power storage device according to the first aspect, in which the liquid has a melting point not higher than 10° C.

A valve structure for a power storage device according to a third aspect of the present invention is the valve structure for a power storage device according to the first or second aspect, in which the liquid has a boiling point not less than 150° C.

A valve structure for a power storage device according to a fourth aspect of the present invention is the valve structure for a power storage device according to any one of the first to third aspects, in which the liquid includes liquid paraffin.

A valve structure for a power storage device according to a fifth aspect of the present invention is the valve structure for a power storage device according to any one of the first to fourth aspects, in which the liquid has a viscosity in a range of 0.1 mPa·s to 2000 mPa·s.

A valve structure for a power storage device according to a sixth aspect of the present invention is the valve structure for a power storage device according to any one of the first to fifth aspects, in which the passage includes an outlet facing an external space, and the valve structure includes a sealing member attached to close the outlet.

A valve structure for a power storage device according to a seventh aspect of the present invention is the valve structure for a power storage device according to any one of the first to sixth aspects, in which the valve structure includes a lid disposed at least on one of a primary side and a secondary side of the check valve and configured to permeate the gas.

A power storage device according to an eighth aspect of the present invention includes the valve structure for a power storage device according to any one of the first to seventh aspects, and the container to which the valve structure for a power storage device is attached.

Advantageous Effects of Invention

According to a valve structure for a power storage device and a power storage device relating to the present invention, infiltration of moisture into a container housing a power storage device element can be suppressed.

DESCRIPTION OF EMBODIMENTS

Hereinafter, a valve structure for a power storage device according to one embodiment of the present invention, a power storage device including the same, and a method of manufacturing the same will be described, with reference to the drawings.

1. First Embodiment

1-1. Overall Configuration of Power Storage Device

Figure 1:
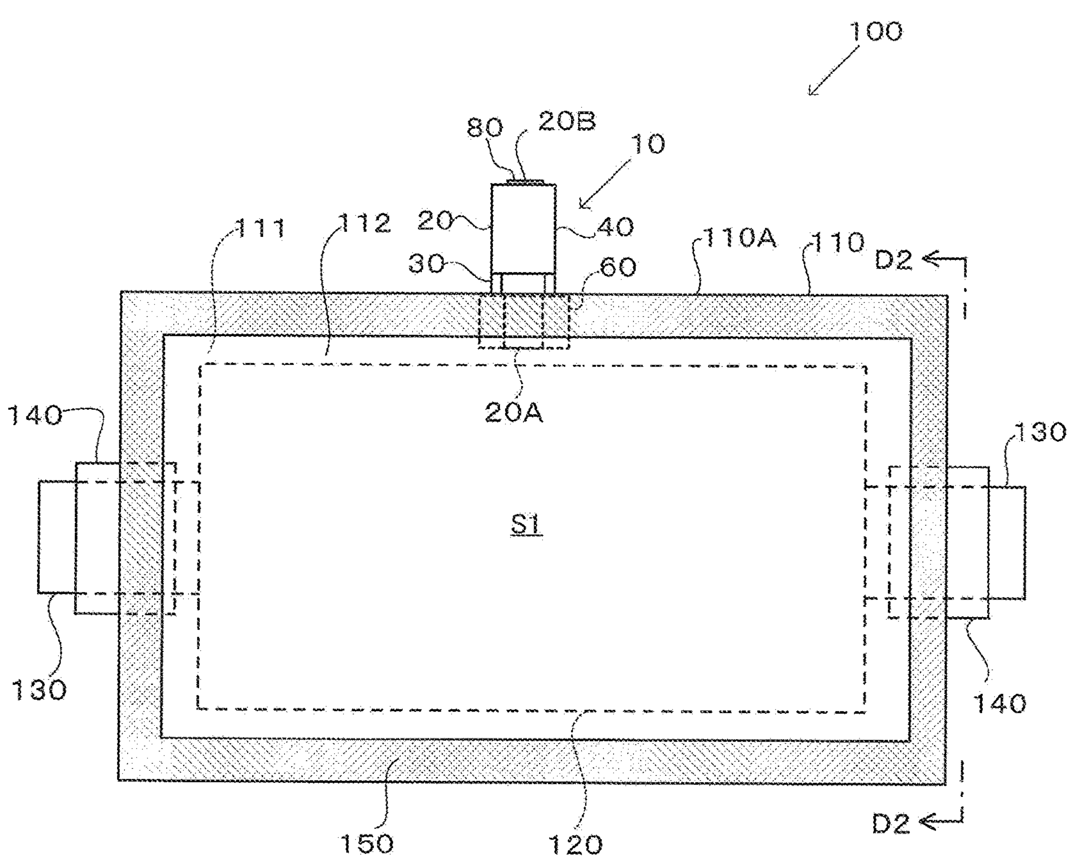
FIG. 1 is a plan view of a power storage device including a valve structure for a power storage device according to a first embodiment.
Figure 2:
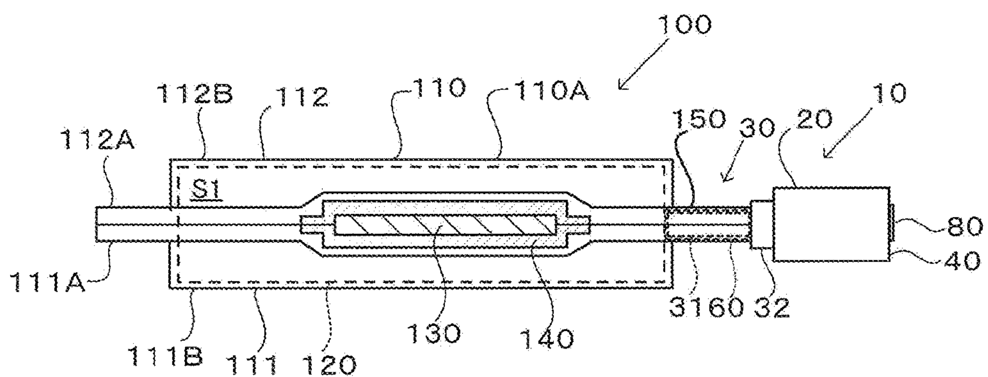
FIG. 2 is a cross-sectional view taken along line D2-D2 in FIG. 1.

FIG. 1 shows a plan view of a power storage device 100 including a valve structure 10 for a power storage device according to the present embodiment. FIG. 2 is a cross-sectional view taken along line D2-D2 in FIG. 1. In these diagrams, regions that are not originally visible from the outside are partially shown with dotted lines for reference purposes. Hereinafter, for convenience of description, the up-down direction and the left-right direction in FIG. 1 will respectively be referred to as “front-rear” and “left-right”, and the up-down direction in FIG. 2 will be referred to as “up-down”, unless specified otherwise. The orientation of the power storage device 100 when in use is, however, not limited thereto.

The power storage device 100 includes a housing body 110, a power storage device element 120, a tab 130, and a tab film 140. The housing body 110 includes an internal space S1 and a peripheral sealing part 150. The power storage device element 120 is housed in the internal space S1 of the housing body 110. The tab 130 is joined at one end to the power storage device element 120, and protrudes outward at the other end from the peripheral sealing part 150 of the housing body 110, and is fused at a portion between the two ends to the peripheral sealing part 150 via the tab film 140.

The housing body 110 includes a container 110A. The container 110A includes packaging materials 111 and 112. In an outer peripheral portion of the container 110A in plan view, the packaging materials 111 and 112 are heat sealed and fused together, thereby forming the peripheral sealing part 150. This peripheral sealing part 150 forms the internal space S1 of the container 110A isolated from the external space. The peripheral sealing part 150 demarcates the periphery of the internal space S1 of the container 110A. Note that the mode of heat sealing referred to here is envisaged to include modes such as ultrasonic fusing and heat fusing from a heat source. In any case, the peripheral sealing part 150 refers to a portion in which the packaging materials 111 and 112 are formed in an integrated manner through fusing. Note that, as shown in FIG. 2, in the portion of the peripheral sealing part 150 where the tab 130 and the tab film 140 are sandwiched, the packaging material 112, the tab 130, a pair of tab films 140 and the packaging material 111 are formed in an integrated manner, and, in the portion of the peripheral sealing part 150 where only the pair of tab films 140 are sandwiched, the packaging material 112, the pair of tab films 140 and the packaging material 111 are formed in an integrated manner.

The packaging materials 111 and 112 are constituted by a resin molded article or a film, for example. The resin molded article referred to here can be manufactured by methods such as injection molding, pressure molding, vacuum molding and blow molding, and in-mold molding may be performed in order to impart designability and functionality. Polyolefin, polyester, nylon, ABS and other types of resin can be used. Also, the film referred to here is a resin film that can be manufactured by methods such as an inflation method and a T-die method, or is obtained by laminating such a resin film on a metal foil, for example. Also, the film referred to here may or may not be a stretched film, and may be a single-layer film or a multilayer film. Also, the multilayer film referred here may be manufactured by a coating method, may be obtained by a plurality of films being adhered together by an adhesive or the like, or may be manufactured by a multilayer extrusion method.

As described above, the packaging materials 111 and 112 can be constituted in various ways, and, in the present embodiment, are constituted by a laminate film. The laminate film can be a laminate obtained by laminating a base material layer, a barrier layer and a heat-sealable resin layer. The base material layer functions as a base material of the packaging materials 111 and 112, and is typically a resin layer forming an outer layer side of the container 110A and having insulating properties. The barrier layer functions to prevent at least moisture or the like from infiltrating the power storage device 100, in addition to improving the strength of the packaging materials 111 and 112, and is typically a metal layer made of an aluminum alloy foil or the like. The heat-sealable resin layer is typically made of a heat sealable resin such as a polyolefin and forms the innermost layer of the container 110A.

The container 110A is not particularly limited in terms of shape, and can be bag-shaped (pouch-shaped), for example. The pouch shape referred to here is conceivably a three-side seal pouch, a four-side seal pouch, a pillow pouch or a gusseted pouch. The container 110A of the present embodiment, however, has a shape such as shown in FIGS. 1 and 2, and is manufactured by the packaging material 111 molded in a tray shape and the packaging material 112 likewise molded in a tray shape and overlaid on the packaging material 111 being heat sealed along an outer peripheral portion thereof in plan view. The packaging material 111 includes a polygonal ring-shaped flange part 111A that corresponds to an outer peripheral portion in plan view, and a molded part 111B that is continuous with an inner edge of the flange part 111A and bulges downward therefrom. Similarly, the packaging material 112 includes a polygonal ring-shaped flange part 112A that corresponds to an outer peripheral portion in plan view, and a molded part 112B that is continuous with the inner edge of the flange part 112A and bulges upward therefrom. The packaging materials 111 and 112 are overlaid one on the other such that the respective molded parts 111B and 112B bulge in opposite directions to each other. In this state, the flange part 111A of the packaging material 111 and the flange part 112A of the packaging material 112 are formed in an integrated manner through heat sealing, and constitute the peripheral sealing part 150. The peripheral sealing part 150 extends around the entire outer periphery of the container 110A and is formed in a polygonal ring shape. Note that one of the packaging materials 111 and 112 may be sheet-shaped.

The power storage device element 120 includes at least a cathode, an anode and an electrolyte, and is, for example, a power storage member such as a lithium-ion battery (secondary battery) or a capacitor. When an anomaly occurs in the power storage device element 120, gas can be produced in the internal space S1 of the container 110A. In the case where the power storage device 100 is a lithium-ion battery, gases such as volatile organic solvent, carbon monoxide, carbon dioxide, methane, ethane, hydrogen and hydrogen fluoride can be produced in the internal space S1 of the container 110A, due to volatilization of organic solvent which is the electrolyte and decomposition of the electrolytic solution. In the case where the power storage device 100 is a capacitor, gas can be produced in the internal space S1 of the container 110A due to a chemical reaction in the capacitor. The power storage device 100 may also be a solid-state battery, in which case the power storage device element 120 can include a solid electrolyte that can produce gas. For example, if the solid electrolyte is a sulfide-based solid electrolyte, hydrogen sulfide gas can be produced.

The tab 130 is a metal terminal that is used for input/output of power of the power storage device element 120. The tab 130 is disposed one at each of the end parts of the peripheral sealing part 150 of the container 110A in the right-left direction, with one tab 130 constituting a terminal on the cathode side and the other tab 130 constituting a terminal on the anode side. One end part of each tab 130 in the left-right direction is electrically connected to an electrode (cathode or anode) of the power storage device element 120 in the internal space S1 of the container 110A, and the other end part protrudes outward from the peripheral sealing part 150. The form of the power storage device 100 described above is particularly preferably used in an electrically driven vehicle such as an electric car or a hybrid car in which a large number of the power storage devices 100 are connected in series and used at a high voltage, for example. Note that the two tabs 130 constituting the terminals of the cathode and anode are not particularly limited in terms of attachment position, and may, for example, be disposed on one side (the same side) of the peripheral sealing part 150.

The tabs 130 are constituted by a metal material such as aluminum, nickel or copper, for example. If the power storage device element 120 is a lithium-ion battery, the tab 130 that is connected to the cathode is typically made of aluminum or the like, and the tab 130 that is connected to the anode is typically made of copper, nickel or the like.

The tab 130 on the left side is sandwiched between the packaging materials 111 and 112 via the tab films 140 at the left end part of the peripheral sealing part 150. The tab 130 on the right side is also sandwiched between the packaging materials 111 and 112 via the tab films 140 at the right end part of the peripheral sealing part 150.

The tab film 140 is a so-called adhesive film, and is configured to adhere to both the packaging materials 111 and 112 and the tabs 130 (metal). The tabs 130 and the innermost layers (heat-sealable resin layers) of the packaging materials 111 and 112 can be fixed together via the tab films 140, even if the materials thereof differ. Note that the tab films 140 are formed in an integrated manner with the tabs 130 by being fused and fixed thereto in advance, and the peripheral sealing part 150 is integrally formed, as shown in FIG. 2, by the tabs 130 to which the tab films 140 are fixed being sandwiched between the packaging materials 111 and 112 and fused.

When gas is produced in the internal space S1 of the container 110A following operation of the power storage device 100, the pressure inside the internal space S1 gradually increases. When the pressure inside the internal space S1 increases excessively, the container 110A could possibly burst and the power storage device 100 could be damaged. The housing body 110 includes a valve structure 10 as a mechanism for preventing such a situation.

The valve structure 10 is a gas vent valve for adjusting the pressure inside the internal space S1, and is, for example, attached to the peripheral sealing part 150 of the container 110A. Hereinafter, the configuration of the valve structure 10 will be described in detail.

1-2. Configuration of Valve Structure

Figure 3:
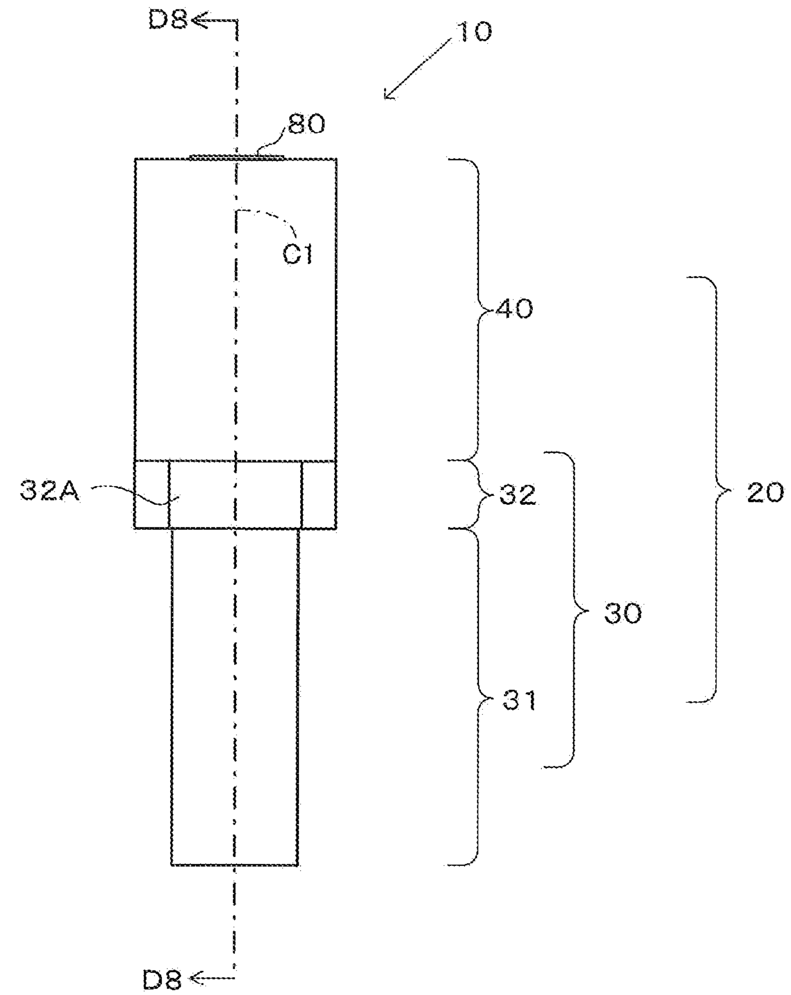
FIG. 3 is a front view of the valve structure in FIG. 1.
Figure 4:
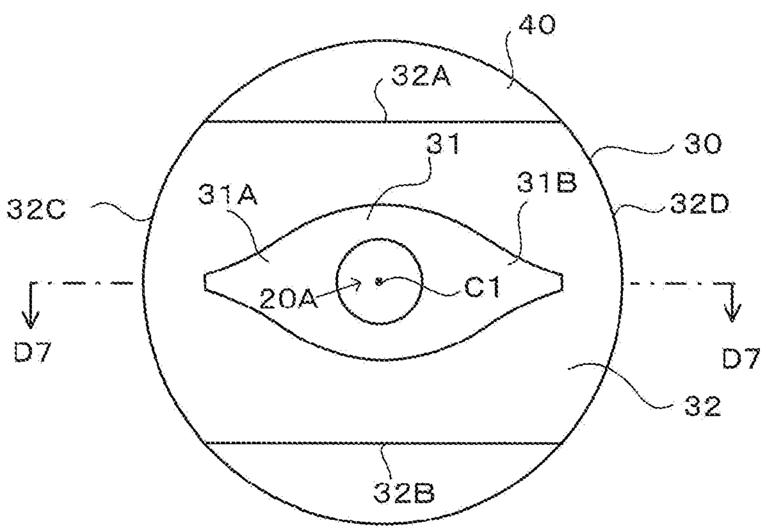
FIG. 4 is a bottom view of the valve structure in FIG. 3.
Figure 5:
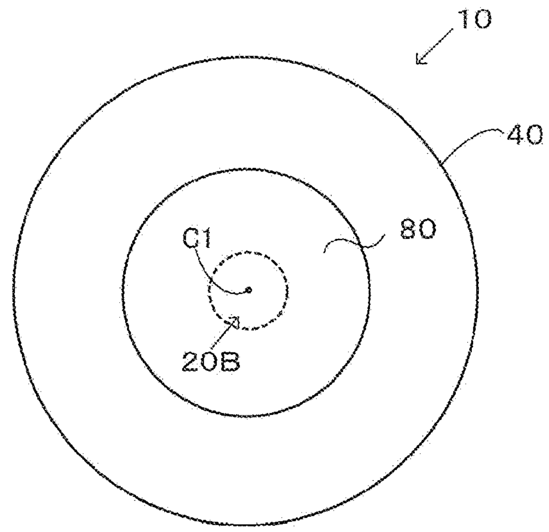
FIG. 5 is a plan view of the valve structure in FIG. 3.
Figure 6:
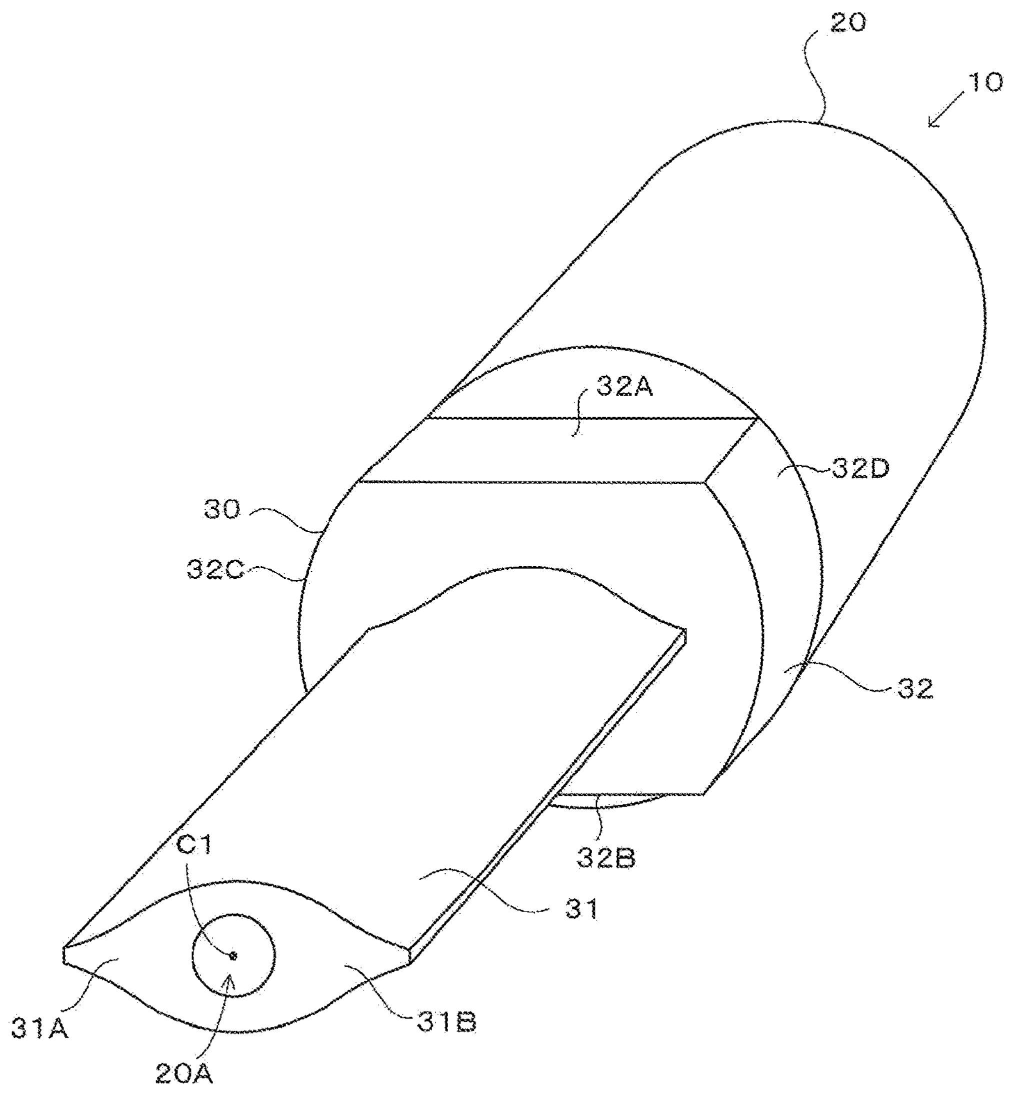
FIG. 6 is a perspective view from a rear side of the valve structure in FIG. 3.

FIG. 3 is a front view of the valve structure 10. The valve structure 10 includes a valve main body 20 and a liquid 70 (see FIGS. 7A and 8). The valve main body 20 includes a first body 30, a second body 40, a check valve (see FIGS. 7A and 8), a sealing member 80, and a lid 90 (see FIGS. 7A and 8). In the present embodiment, the first body 30 and the second body 40 are disposed continuously in the stated order in a direction from the inside of the container 110A (see FIG. 1) to the outside (direction from the rear side to the front side). FIG. 4 is a diagram in which the valve structure 10 is viewed from the first body side (from the rear side). FIG. 5 is a diagram in which the valve structure 10 is viewed from the second body 40 side (from the front side). FIG. 6 is a perspective view in which the valve structure 10 is viewed from the first body 30 side (from the rear side).

Figure 7A:
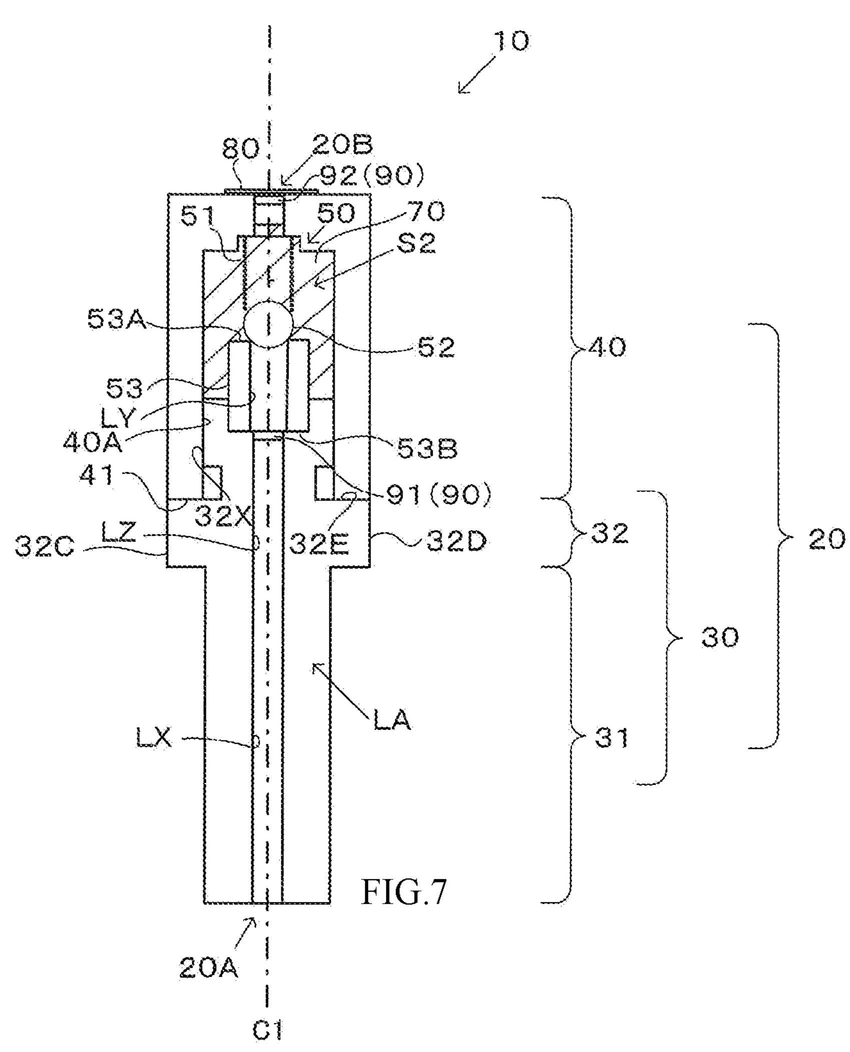
FIG. 7A is a cross-sectional view taken along line D7-D7 in FIG. 4.
Figure 8:
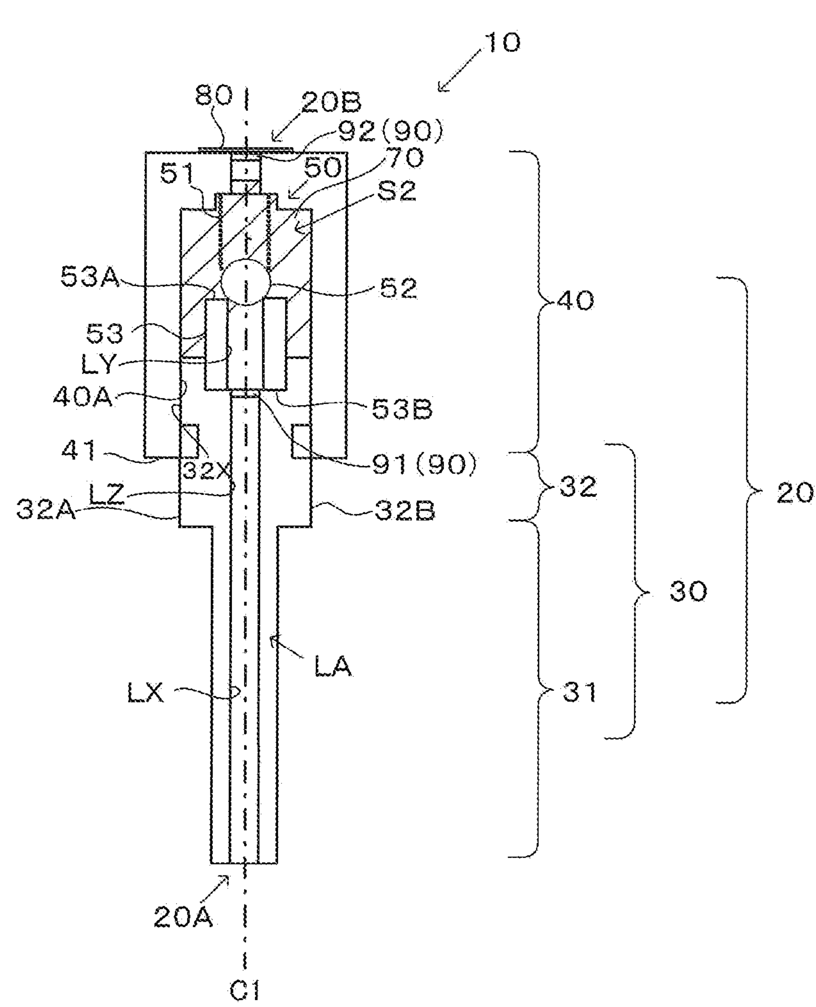
FIG. 8 is a cross-sectional view taken along line D8-D8 in FIG. 3.

FIG. 7A is a cross-sectional view taken along line D7-D7 in FIG. 4. FIG. 8 is a cross-sectional view taken along line D8-D8 in FIG. 3. As shown in FIGS. 7A and 8, the check valve 50 is housed in a housing space S2 demarcated by the first body 30 and the second body 40. The check valve 50 opens when the internal pressure of the container 110A (see FIG. 1) increases due to gas produced inside the container 110A, and passes the gas from the internal side of the container 110A to the external side. More specifically, the check valve 50 constitutes a relief valve that switches between open and closed, according to the pressure on the primary side thereof, that is, the pressure inside the internal space S1 (see FIG. 1). A passage LA is formed in the housing space S2 inside the valve main body 20. The passage LA communicates the inside of the container 110A with the outside thereof, and includes an inlet 20A facing the internal space S1 of the container 110A and an outlet 20B facing the external space.

The check valve 50 is disposed to block the passage LA in the closed state. When the pressure inside the internal space S1 increases due to gas produced in the internal space S1, the check valve 50 opens, and the gas is passed from the primary side to the secondary side of the check valve 50, that is, from the internal space S1 to the external space. The check valve 50 seals the internal space S1 from the external space in the closed state.

The first body 30 includes an attachment part 31 and a coupling part 32. The attachment part 31 is for attaching the valve structure 10 to the container 110A. The attachment part 31 is heat sealed together with the packaging materials 111 and 112 via a heat fusion film 60 (see FIG. 1) during molding of the container 110A. Due to this heat sealing, the packaging materials 111 and 112 and the outer peripheral surface of the attachment part 31 are joined by fusing via the heat fusion film 60, and the attachment part 31 is fixed to the peripheral sealing part 150 in a state of being sandwiched between the packaging materials 111 and 112 (see FIG. 2).

The coupling part 32 is disposed on the outer side of the peripheral sealing part 150 and is not sandwiched between the packaging materials 111 and 112 (see FIGS. 1 and 2). The second body 40 which is disposed further on the outer side than the coupling part 32 is also disposed on the outer side of the peripheral sealing part 150 and not sandwiched between the packaging materials 111 and 112. As a result, the possibility of the check valve 50 that is held by the second body 40 being damaged by deformation or the like due to the heat at the time of attaching the attachment part 31 to the container 110A by heat sealing is reduced.

The attachment part 31, the coupling part 32 and the second body 40 extend coaxially to each other. The attachment part 31, the coupling part 32 and the second body 40 have a common central axis C1. The attachment part 31 has a first ventilation passage LX, the second body 40 has a second ventilation passage LY, and the coupling part 32 has a third ventilation passage LZ. These ventilation passages LX to LZ also extend coaxially to each other centered on the central axis C1. In the present embodiment, the inlet 20A and the outlet 20B are disposed in the end faces of the valve main body 20 in the front-rear direction rather than in the outer peripheral surface thereof, and, in particular, the central axis C1 extending linearly in the front-rear direction passes through the center of the inlet 20A and outlet 20B. Although not limited thereto, cross sections of the ventilation passages LX to LZ orthogonal to the central axis C1 are circular. The ventilation passages LX to LZ communicate with each other and together constitute the passage LA. The third ventilation passage LZ is disposed further on the external side of the container 110A than the first ventilation passage LX. The second ventilation passage LY is disposed further on the external side of the container 110A than the third ventilation passage LZ.

As shown in FIGS. 4 and 6, the attachment part 31 has a non-circular outer shape when viewed along the direction in which the central axis C1 extends. More specifically, the attachment part 31 has a first wing-shaped part 31A and a second wing-shaped part 31B that are respectively formed to become thinner toward the left and right from a middle part thereof in the left-right direction, when viewed along the direction in which the central axis C1 extends. In the present embodiment, the attachment part 31 thus becomes thicker approaching the middle part thereof in the width direction of the power storage device 100 (left-right direction), and becomes thinner approaching the edge parts thereof in the width direction of the power storage device 100 (left-right direction).

In the present embodiment, since the first wing-shaped part 31A and the second wing-shaped part 31B are formed, the lower half and upper half of the outer peripheral surface of the attachment part 31 that are respectively covered by the packaging material 111 and the packaging material 112 are both smoothly curved surfaces. Also, as compared with the case where the attachment part 31 is formed in a cylindrical shape, for example, the change in thickness in the up-down direction of the power storage device 100 where the peripheral sealing part 150 transitions from not sandwiching the attachment part 31 to sandwiching the attachment part 31 is smooth due to the first wing-shaped part 31A and the second wing-shaped part 31B. As a result, excessive force is not applied to the packaging materials 111 and 112 in portions of the peripheral sealing part 150 surrounding where the attachment part 31 is attached. The attachment part 31 can thus be firmly fixed to the peripheral sealing part 150 via the heat fusion film 60.

The coupling part 32 has a generally columnar outer shape centered on the central axis C1 that is partially cut away. More specifically, the coupling part 32 has a generally columnar outer shape centered on the central axis C1 that is cut away in one plane spaced a certain distance away from the central axis C1 and is further cut away in another plane positioned symmetrically to the one plane with respect to the central axis C1. Therefore, the coupling part 32 has a first plane 32A and a second plane 32B that form a pair of planes. The first plane 32A and the second plane 32B are parallel (including substantially parallel; this similarly applying below) to each other. The first plane 32A and the second plane 32B are parallel (including substantially parallel; this similarly applying below) in the direction in which the central axis C1 extends. Also, in the present embodiment, the first plane 32A and the second plane 32B are parallel (including substantially parallel; this similarly applying below) in the direction in which the peripheral sealing part 150 extends. The outer peripheral surface of the coupling part 32 is constituted by the first plane 32A and the second plane 32B, and curved surfaces 32C and 32D that couple the first plane 32A and the second plane 32B to each other. The curved surfaces 32C and 32D both have a circular arc shape centered on the central axis C1 and overlap with the outer shape of the second body 40, when viewed along the direction in which the central axis C1 extends. A coupling part 32 such as described above can be formed by cutting the outer peripheral surface of a cylindrical member, such that the first plane 32A and the second plane 32B are formed. Constituting the outer shape of the coupling part 32 in this way makes the valve structure 10 easy to grasp. Carrying the valve structure 10 to the machining position and fixing the valve structure 10 at the machining position, for example, are thereby facilitated. The valve structure 10 can thus be easily attached to the container 110A.

The second body 40 is cylindrical and demarcates the housing space S2 that, together with the first body 30, houses the check valve 50. The first body 30 and the second body 40 are assembled with the check valve 50 housed in the housing space S2. The first body 30 and the second body 40 are joined by at least one of an adhesive, a screw structure, and engagement of raised and recessed parts, for example. In the present embodiment, the first body 30 and the second body 40 are joined by the engagement of a male thread 32X (see FIG. 7A) that is formed on the outer surface of the coupling part 32 of the first body 30 with a female thread 40A (see FIG. 7A) that is formed on the inner surface of the second body 40 and an adhesive that is applied to the male thread 32X and the female thread 40A. The adhesive is not particularly limited in terms of material, and can be constituted by an acid-modified polyolefin and an epoxy resin.

Such an adhesive is superior in terms of being able to suppress degradation of the adhesive performance caused by the electrolytic solution that is housed within the container 110A, as compared with the case where an adhesive made of modified silicone resin is used, for example. Note that any means can be employed in joining the first body 30 and the second body 40. In the present embodiment, at least one of the adhesive and the structure relating to engagement of the male thread 32X and the female thread 40A may thus be omitted.

As described above, in the present embodiment, the attachment part 31, the coupling part 32 and the second body 40 all have different outer shapes, according to the roles allocated to the respective parts, when viewed along the direction in which the central axis C1 extends.

The second body 40 holds a portion of the valve structure 10 that has a main structure for functioning as a gas venting valve. In the present embodiment, the check valve 50 has a spring 51, a valve body 52 and a valve seat 53 that serve as a valve mechanism that is housed within the second ventilation passage LY inside the second body 40. The spring 51, the valve body 52 and the valve seat 53 are disposed in the stated order toward the inlet 20A from the outlet 20B within the second ventilation passage LY. Note that, in the present embodiment, the first body 30 and the valve seat 53 are constituted as separate parts, as shown in FIGS. 7A and 8, but may be constituted integrally.

The valve seat 53 receives the valve body 52 that is biased from the outer side by the spring 51, at which time the valve structure 10 is closed. The spring 51 is, for example, a coil spring, but is not limited thereto, and can also be a leaf spring, for example. In the present embodiment, the valve seat 53 has a cylindrical shape that extends centered on the central axis C1, and has a top face 53A and a bottom face 53B that respectively define the end faces on the front and rear sides thereof in the front-rear direction. The valve body 52 is, for example, a ball-type valve body. Part of the surface of the valve body 52 is received by the top face 53A of the valve seat 53 and, when the check valve 50 is closed, comes in contact with the top face 53A. The spring 51 extends in a spiral shape centered on the central axis C1. The spring 51 is coupled to the valve body 52.

The valve seat 53 and the first body 30 can be adhered by an adhesive, for example. The adhesive is not particularly limited in terms of material, and, as a preferred example in the case where the valve seat 53 is made of fluorocarbon rubber and the first body 30 is made of a metal such as aluminum, is similar to the adhesive illustrated for use when joining the first body 30 and the second body 40. Also, from the viewpoint of preventing opening of the valve structure 10, an adhesive can also be applied as appropriate in various other places. For example, an adhesive can be applied between an end face 41 on the rear side of the second body 40 and an end face 32E on the front side of the coupling part 32.

The attachment part 31 is fixed to the peripheral sealing part 150, such that gas produced in the internal space S1 of the container 110A flows into the first ventilation passage LX. That is, the first ventilation passage LX inside the attachment part 31 communicates with the internal space S1 of the container 110A. Therefore, when the pressure inside the internal space S1, that is, the pressure inside the space on the primary side of the check valve 50, reaches a predetermined pressure, gas that has flowed out of the internal space S1 and passed through the first ventilation passage LX and the third ventilation passage LZ pushes the valve body 52 to the outlet 20B side. When the valve body 52 is pushed and moves away from the valve seat 53, the check valve 50 opens due to the spring 51 deforming and the valve body 52 moving to the outlet 20B side. In this open state, gas produced in the internal space S1 flows out through the gap formed between the valve body 52 and the valve seat 53 toward the outlet 20B and is discharged to the external space. In this way, when the gas in the internal space S1 is discharged from the passage LA, the pressure on the internal space S1 side that pushes the valve body 52 to the outlet 20B side weakens, and the force of the spring 51 biasing the valve body 52 to the inlet 20A side increases to greater than the pressure on the internal space S1 side. As a result, the shape of the spring 51 is restored, and the check valve 50 closes again.

The check valve 50 is, in the closed state, able to prevent air from infiltrating the internal space S1 of the container 110A from the external space. After the check valve 50 has opened once, the internal space S1 is kept at a relatively high pressure at least comparable to the atmospheric pressure, and thus there is very little chance of air infiltrating the internal space S1. The valve structure 10 is, with a check valve 50 such as described above, able to effectively prevent air from infiltrating the internal space S1, and to prevent degradation of the power storage device element 120 caused by moisture or the like contained in the air. Also, even when the check valve 50 is open, there is little chance of air infiltrating the internal space S1. This is because, in the open state, the primary side of the check valve 50 is maintained at a pressure higher than or comparable to the pressure on the secondary side.

The liquid 70 shown in FIGS. 7A and 8 is disposed in the housing space S2. The hatching in FIGS. 7A and 8 indicates an example of the range over which the liquid 70 is present.

The liquid 70 is disposed in contact with the valve body 52 and the valve seat 53, in order to suppress infiltration of moisture into the internal space S1 (see FIG. 1). The type of liquid 70 is freely selectable. In the present embodiment, the liquid 70 is liquid paraffin. An ionic liquid, a liquid oil such as silicone oil or the like can also be used as the liquid 70. In a preferred example, the liquid 70 preferably has the property of existing in liquid form in the normal use environment of the power storage device 100. As such, the melting point of the liquid 70 is preferably 10° C. or less, and more preferably 0° C. or less. Similarly, the boiling point of the liquid 70 is preferably 150° C. or greater. In the present embodiment, the temperatures illustrated as the melting point and boiling point of the liquid 70 are temperatures in the normal use environment of the power storage device 100. The power storage device 100 of the present embodiment is, for example, used at atmospheric pressure or in a vacuum. The power storage device 100 may also be used in an environment other than at atmospheric pressure or in a vacuum. The melting point of the liquid is measured based on "JIS K0064-1992 Test methods for melting point and melting range of chemical products". The boiling point of the liquid is measured by "JIS K0066-1992 Test methods for distillation of chemical products". In the case where the power storage device 100 is used at atmospheric pressure, the measurement conditions for melting point and boiling point are normal temperature and normal humidity defined by "JIS Z8703-1983".

The viscosity of the liquid 70 is freely selectable. In a preferred example, the viscosity of the liquid is determined based on the viewpoint of suitably permeating the gas and the viewpoint of handling. A preferred example of the maximum viscosity of the liquid 70 is 2000 mPa·s. When the viscosity of the liquid 70 is 2000 mPa·s or less, the gas can be suitably permeated. A more preferred example of the maximum viscosity of the liquid 70 is 500 mPa·s. An even more preferred example of the maximum viscosity of the liquid 70 is 100 mPa·s. A preferred example of the minimum viscosity of the liquid 70 is 0.1 mPa·s. When the viscosity of the liquid 70 is 0.1 mPa·s or more, the liquid can be suitably handled. A more preferred example of the minimum viscosity of the liquid 70 is 0.5 mPa·s. An even more preferred example of the minimum viscosity of the liquid 70 is 1.0 mPa·s. An example of a preferred range of viscosity of the liquid 70 is 0.1 mPa·s to 2000 mPa·s. An example of a more preferred range of viscosity of the liquid 70 is 0.5 mPa·s to 500 mPa·s. An example of an even more preferred range of viscosity of the liquid 70 is 1.0 mPa·s to 100 mPa·s. Note that the viscosity of the liquid 70 is the viscosity at 23° C. Also, in the case where the liquid 70 is crude oil or petroleum, the viscosity of the liquid 70 is calculated by multiplying the kinematic viscosity measured based on "JIS K2283 Crude petroleum and petroleum products—Determination of kinematic viscosity and calculation of viscosity index from kinematic viscosity" by the density. In the case where the liquid 70 is other than crude oil or petroleum, the viscosity of the liquid 70 is measured based on the "JIS 28803 methods for viscosity measurement of liquid".

Figure 11:
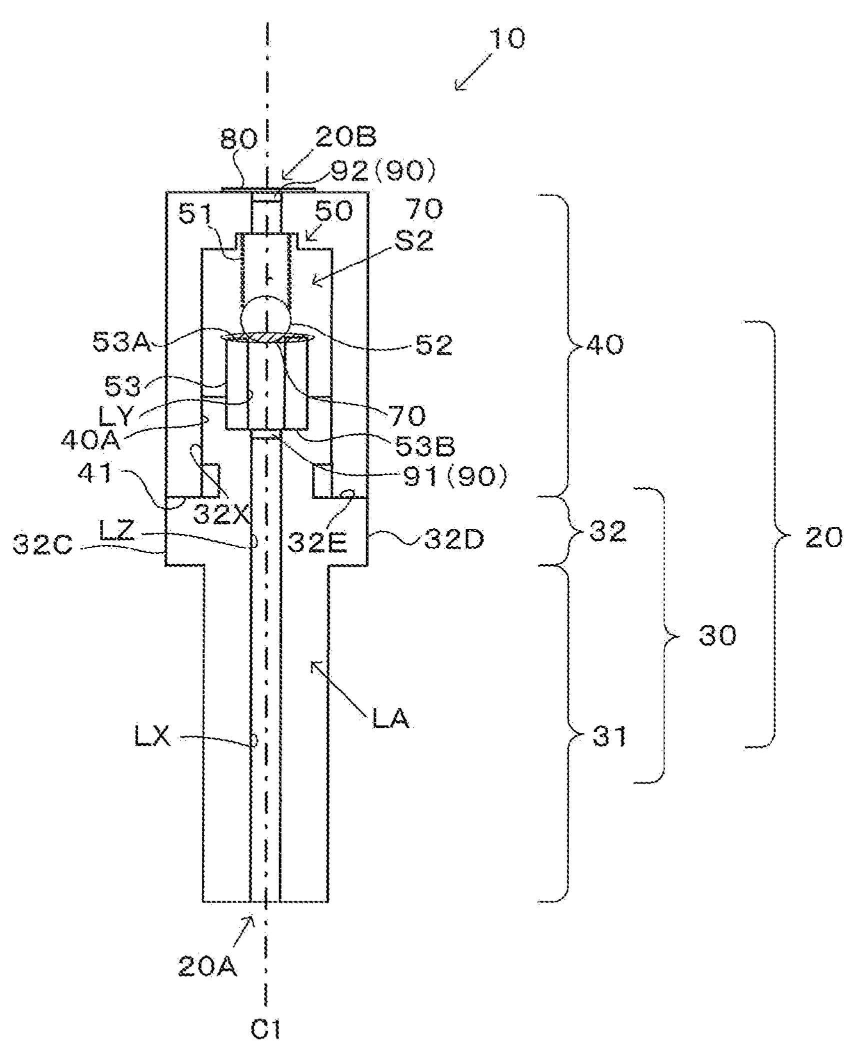
FIG. 11 is a cross-sectional view of a valve structure of a variation.

The specific mode of disposition of the liquid 70 is freely selectable, as long as the liquid 70 comes in contact with the valve body 52 and the valve seat 53. In the present embodiment, a predetermined range of the housing space S2 is filled with the liquid 70. The housing space S2 is filled with the liquid 70 through at least one of the inlet 20A and the outlet 20B after assembling the first body 30 and the second body 40, for example. According to the present embodiment, with the check valve 50 open, gas produced in the internal space S1 (see FIG. 1) flows out through the gap formed between the valve body 52 and the valve seat 53. The outflowing gas passes through the liquid 70 in the form of bubbles, and flows out toward the outlet 20B after passing through the liquid 70. On the other hand, if air and moisture or the like contained in the air infiltrate the valve structure 10 through the outlet 20B, the liquid 70 prevents moisture or the like from infiltrating further to the internal side of the container 110A than the check valve 50. Infiltration of air and moisture or the like contained in the air into the container 110A is thus suppressed. Note that, as shown in FIG. 11, the liquid 70 need only at least adhere to the portion of the surface of the valve body 52 that comes in contact with the valve seat 53 and the portion of the surface of the valve seat 53 that comes in contact with the valve body 52, when the check valve 50 is closed. Such a mode of disposition of the liquid 70 can be formed by injecting air through the inlet 20A to dispel the liquid in the state shown in FIG. 7A, for example. In the mode of disposition of the liquid 70 shown in FIG. 11, the liquid 70 forms a film on the portion of the surface of the valve body 52 that comes in contact with the valve seat 53 and on the portion of the surface of the valve seat 53 that comes in contact with the valve body 52, when the check valve 50 is closed. When the check valve 50 is open, gas produced in the internal space S1 passes through the film of liquid 70 in the form of bubbles or breaks through the film of liquid 70 and flows out toward the outlet 20B. If the gas breaks through the film of liquid 70, the valve body 52 and the valve seat 53 come in contact, due to the check valve 50 transitioning from open to closed, and the film of liquid 70 forms again.

The materials constituting the various parts of the valve structure 10 are not particularly limited. To give a preferred example, the valve body 52 can be made of a fluorocarbon resin such as PolyTetraFluoroEthylene (PTFE), and the valve seat 53 can be made of fluorocarbon rubber such as fluoroelastomer (FKM) rubber. Furthermore, the spring 51 can be made of a metal such as stainless steel, and the attachment part 31, the second body 40 and the coupling part 32 can be made of a metal such as an aluminum alloy, stainless steel, sheet steel or titanium. The second body 40 is responsible for protecting the check valve 50, and thus is preferably made of a metal. The valve body 52 can also be made of a metal such as stainless steel or a fluorocarbon rubber such as FKM rubber. Note that in the case where the valve body 52 is made of a fluorocarbon rubber such as FKM rubber, the valve seat 53 is preferably made of a fluorocarbon resin such as PTFE.

The attachment part 31 and the second body 40 may be constituted by the same material or may be constituted by different materials. In the case where the attachment part 31 is constituted by a resin, for example, the outer peripheral surface of the attachment part 31 is joined by fusing to the packaging materials 111 and 112, and thus the heat fusion film 60 described later is not required. The configuration of the power storage device 100 can thus be simplified. The resin constituting the attachment part 31 is, for example, a fluorocarbon resin, a polyester resin, a polyimide resin, a polycarbonate resin, a polyolefin resin or an acrylic resin.

The second body 40 is preferably constituted by a material having a higher melting point than the material constituting the attachment part 31. According to such a configuration, since the second body 40 is constituted by a material having a higher melting point than the material constituting the attachment part 31, the chances of the check valve 50 being deformed or damaged can be reduced, even when pressure and heat are applied to the attachment part 31 at the time of fusing the opposing heat-fusible resin layers of the packaging materials 111 and 112.

In the valve structure 10, a configuration may be adopted in which the first body 30 and the second body 40 are entirely constituted by a metal or a resin. In the valve structure 10, a configuration may also be adopted in which the first body 30 and the second body 40 are entirely constituted by a material made of a mixture of a metal and a resin. In the valve structure 10, a configuration may also be adopted in which the first body 30 is constituted by a material made of a mixture of a metal and a resin, and the second body 40 is constituted by a metal. In the valve structure 10, a configuration may also be adopted in which the first body 30 is constituted by a resin and the second body 40 is constituted by a metal. For example, in the valve structure 10, in the case where the first body 30 is constituted by a material made of a mixture of a metal and a resin, the outer peripheral surface of the attachment part 31 is joined by fusing to the packaging materials 111 and 112, and thus the heat fusion film 60 described later is not required. Also, the first wing-shaped part 31A and the second wing-shaped part 31B of the attachment part 31 can be easily machined. Furthermore, the attachment part 31 can be precisely heat sealed to the packaging materials 111 and 112. Examples of the resin constituting the first body 30 and the second body 40 include an olefin resin, in addition to the resin constituting the attachment part 31 described above. An olefin resin is, for example, acid-modified polypropylene or a resin obtained by two-shot molding acid-modified polypropylene and polypropylene. Note that, in the case where a resin material is extrusion molded on a metal material, a coating of a corrosion inhibitor described later is preferably applied to the surface of the portion that is constituted by the metal material to form a corrosion inhibitor coating layer.

The heat fusion film 60 shown in FIG. 1 and the like is configured to adhere to both the valve structure 10 and the packaging materials 111 and 112 of the container 110A by heat sealing. The heat fusion film 60 is fused to the attachment part 31 of the first body 30, prior to the first body 30 and the second body 40 are assembled, while the check valve 50 is housed in the housing space S2 (see FIG. 7A). The heat fusion film 60 is fused to the attachment part 31 so as to cover most of the surface of the attachment part 31. Various known adhesive films can be employed as the heat fusion film 60. The heat fusion film 60 may, for example, be a single-layer film of maleic anhydride-modified polypropylene (PPa), or a laminate film having multiple layers consisting of a PPa layer, a polyethylene naphthalate (PEN) layer and a PPa layer. The heat fusion film 60 may also be a laminate film having multiple layers consisting of a PPa layer, a polypropylene (PP) layer and a PPa layer. Instead of the above PPa resin, a metal adhesive resin such as an ionomer resin, modified polyethylene or EVA is also applicable. In the present embodiment, the heat fusion film 60 employs a laminate film having a three-layer structure containing a core material and consisting of a PPa layer, a polyester fiber layer and a PPa layer. Various known materials can be employed as the core material apart from the polyester fiber mentioned above. For example, the core material may be a polyester film made of PEN, polyethylene terephthalate, polybutylene terephthalate or the like, or may be polyamide fiber or carbon fiber.

Also, it is preferable, from the viewpoint of electrolytic solution resistance, that the surface of the attachment part 31 is coated with a corrosion inhibitor to form a corrosion inhibitor coating layer. Note that this particularly applies in the case where the attachment part 31 is made of a metal such as aluminum, but may also apply in the case where the attachment part 31 is constituted by other materials. Such coating can be performed by immersing the attachment part 31 in a corrosion inhibitor liquid and then implementing a baking process. A corrosion inhibitor coating layer can thereby be formed on the outer surface of the attachment part 31 and the inner surface facing the first ventilation passage LX, and corrosion of the outer surface due to gas produced by the power storage device element 120 and corrosion of the inner surface due to gas passing through the first ventilation passage LX can be prevented. Particularly from the viewpoint of electrolytic solution resistance, a similar coating may also be applied to the surfaces of the coupling part 32, the second body 40 and the check valve 50, in addition to the attachment part 31, to form a corrosion prevention coating layer. In the case of coating the surfaces of the coupling part 32, the second body 40 and the check valve 50 with a corrosion inhibitor, the corrosion prevention coating layer is preferably formed over a predetermined range that particularly includes places where the valve seat 53 comes in contact the second body 40, the valve body 52, the male thread 32X of the coupling part 32 and the female thread 40A of the second body 40. It is, however, particularly beneficial to apply such a coating to the attachment part 31, from the viewpoint of suppressing degradation of the adhesive performance of the attachment part 31 and the packaging materials 111 and 112 caused by the electrolytic solution. Although not particularly limited in terms of material, the corrosion inhibitor is preferably acid-resistant, and the corrosion inhibitor coating layer can be formed by a chromic acid chromate treatment, a phosphoric acid chromate treatment or the like.

Figure 7B:
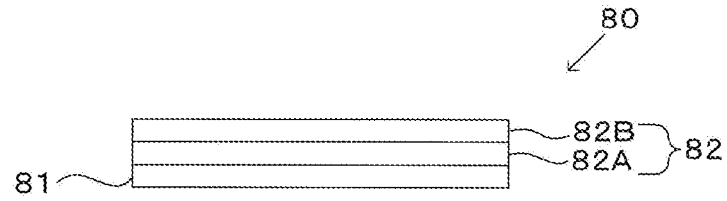
FIG. 7B is a cross-sectional view of a sealing member in FIG. 7A.

The sealing member 80 is attached to the second body 40 so as to close the outlet 20B. For example, leakage of the liquid 70 from the outlet 20B during transportation of the valve structure 10 and contamination of the inside of the valve structure 10 by foreign matter through the outlet 20B are thus suppressed. When the valve structure 10 is attached to the container 110A, the sealing member 80 is peeled off the second body 40. The sealing member 80 shown in FIG. 7B includes, for example, a surface layer 81 that closes the outlet 20B and a base material layer 82 that is laminated on the surface layer 81. Note that the sealing member 80 may be an adhesive containing an acrylic resin, or may be a single-layer structure having only the surface layer 81.

The material constituting the surface layer 81 preferably includes at least one of a polyolefin and an elastomer, for example. When a polyolefin is present on the surface of the surface layer 81, the sealing member 80 can be easily peeled off the second body 40 at the time of using the valve structure 10. The polyolefin is polyethylene or polypropylene, for example. In the case where the material constituting the surface layer 81 includes an elastomer, the surface layer 81 has adhesiveness, thus enabling the sealing member 80 to be easily positioned relative to the outlet 20B. The elastomer is, for example, a thermoplastic elastomer.

The base material layer 82 includes, for example, a first base material layer 82A laminated on the surface layer 81 and a second base material layer 82B laminated on the first base material layer 82A. The material constituting the first base material layer 82A preferably includes a metal such as an aluminum alloy, from the viewpoint of improving water vapor barrier properties and airtightness, for example. In the case where a metal is included in the material constituting the first base material layer 82A, the sealing member 80 has stiffness as a whole, and thus can be easily peeled off the second body 40. The second base material layer 82B is laminated on the first base material layer 82A via an adhesive, for example. The material constituting the second base material layer 82B includes polyethylene terephthalate, for example.

The lid 90 has a pore diameter of $10^{-2}$ μm to $10^{0}$ μm, for example, and is, for example, constituted by a PTFE (PolyTetraFluoroEthylene) membrane that selectively permeates only gas, and does not permeate the organic solvent contained in the power storage device element 120 or the liquid 70. The PTFE membrane is soft, and thus, in the case of having insufficient strength, a mesh made of polypropylene, polyester or the like or a nonwoven fabric may be integrally molded with the PTFE membrane and this reinforced PTFE membrane may be used as the lid 90. Also, the material constituting the lid 90 may, for example, be a metal mesh, a synthetic resin mesh, or a nonwoven fabric. The lid 90 includes a first lid 91 that is disposed on the primary side of the check valve 50 and a second lid 92 that is disposed on the secondary side of the check valve 50.

The first lid 91 inhibits the organic solvent contained in the power storage device element 120 (see FIG. 2) from passing through the passage LA, opening the check valve 50, and flowing outside the valve main body 20. The position where the first lid 91 is disposed in the valve main body 20 is freely selectable, as long as the position is on the primary side of the check valve 50. In the present embodiment, the first lid 91 is disposed in the vicinity of the bottom face 53B of the valve seat 53 in the passage LA. The first lid 91 may also be disposed in the vicinity of the inlet 20A in the passage LA, or may also be disposed anywhere between the bottom face 53B of the valve seat 53 and the inlet 20A.

The second lid 92 inhibits the liquid 70 from leaking out through the outlet 20B, when the sealing member has been peeled off, such as during use of the valve structure 10, for example. The second lid 92 is, for example, disposed in the vicinity of the outlet 20B. The second lid 92 may be disposed anywhere between the surface of the liquid 70 and the outlet 20B.

2. Second Embodiment

In a second embodiment, the configuration of the valve structure 10 differs, as compared with the first embodiment. The remaining configuration is basically similar to the first embodiment. Hereinafter, configuration that is the same as the first embodiment will be given the same reference numerals and description thereof will be omitted, with the following description focusing on the differences from the first embodiment.

Figure 9:
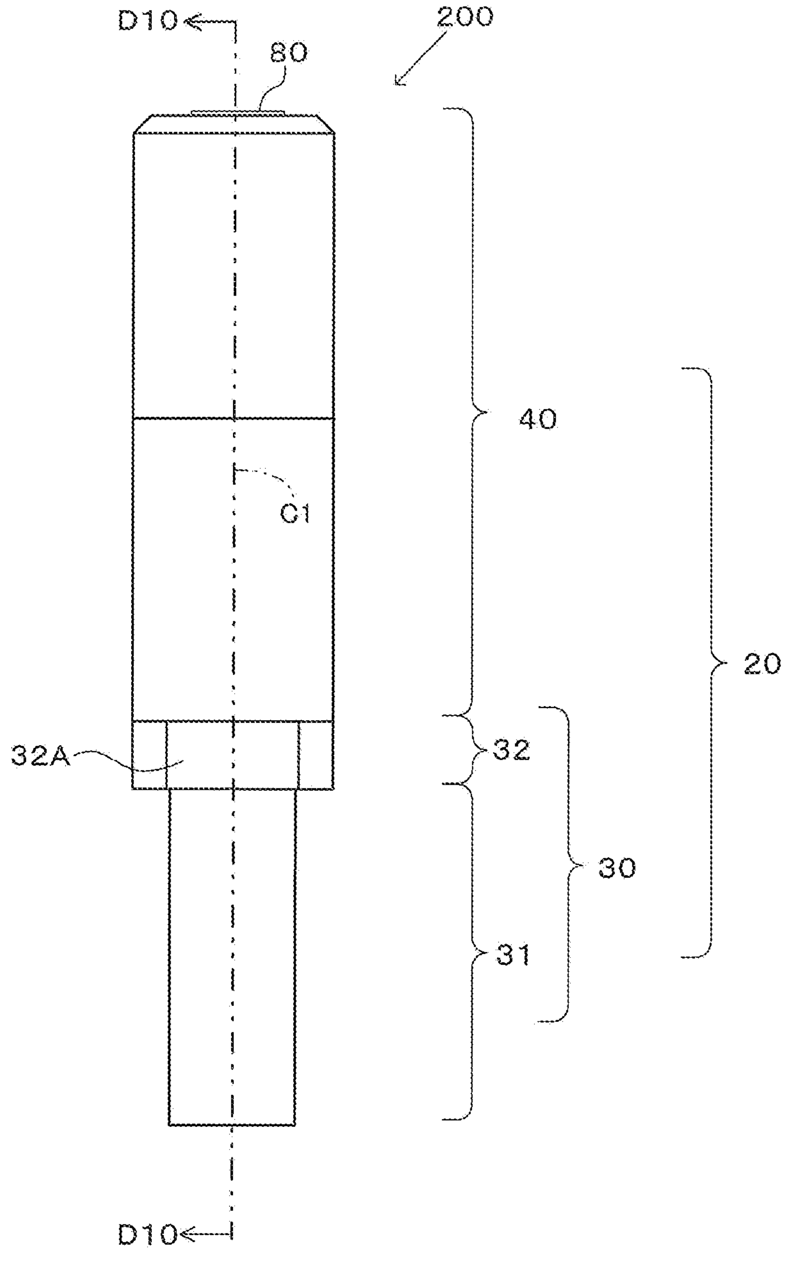
FIG. 9 is a front view of the valve structure for a power storage device according to a second embodiment.
Figure 10:
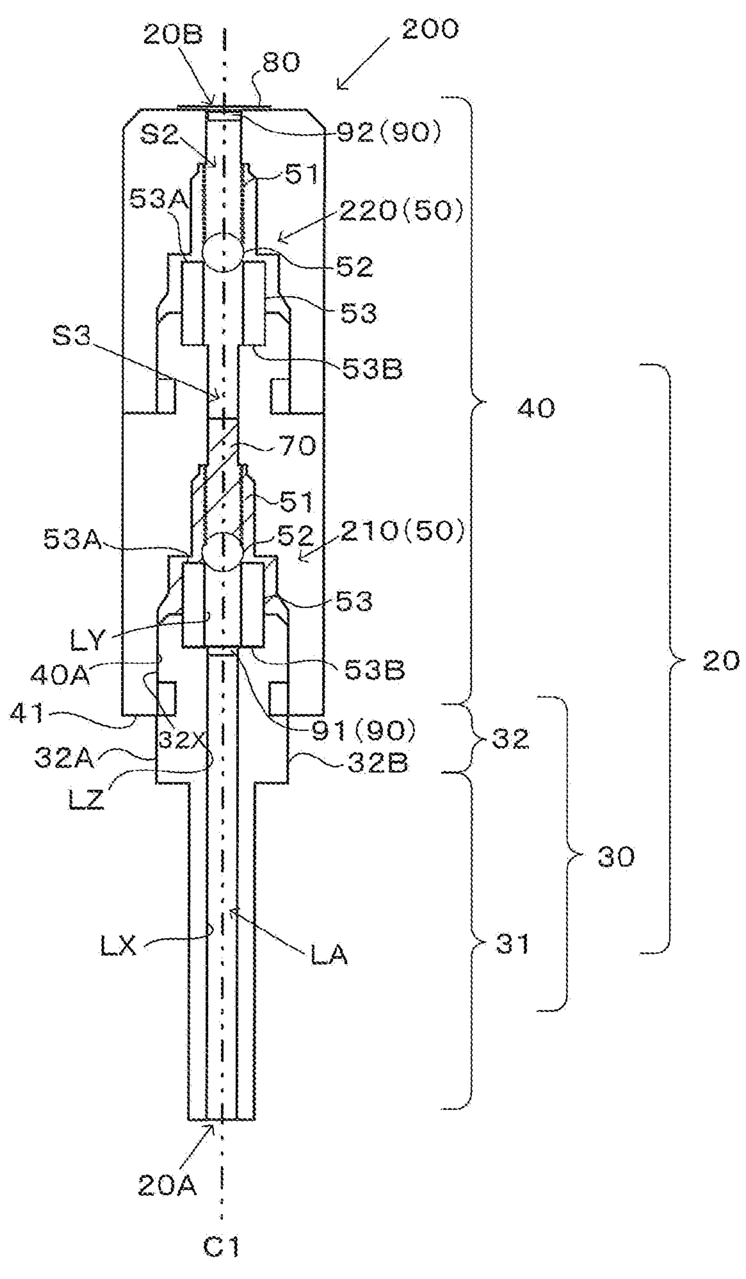
FIG. 10 is a cross-sectional view taken along line D10-D10 in FIG. 9.

FIG. 9 is a front view of a valve structure 200 of the second embodiment. FIG. 10 is a cross-sectional view taken along line D10-D10 in FIG. 9. The second body 40 of the present embodiment is configured to hold a plurality of check valves 50. In the present embodiment, the second body 40 holds two check valves 50. Hereinafter, in order to distinguish the two check valves 50, the check valve 50 that is disposed closer to the inlet 20A may be referred to as check valve 210, and the check valve 50 that is disposed closer to the outlet 20B may be referred to as check valve 220.

The check valves 210 and 220 are arranged along the direction in which the passage LA extends, with the check valve 220 disposed on the secondary side (external side) of the check valve 210. Gas produced in the internal space S1 (see FIG. 1) can be discharged through the passage LA to outside the container 110A by opening the check valves 210 and 220. Note that the check valves 210 and 220 do not necessarily open at the same time, and often open at different times.

The check valves 210 and 220 are disposed at different positions along the direction in which the passage LA extends to block the passage LA in the closed state. In the present embodiment, the portion (valve box) of the check valves 210 and 220 that constitutes the body is constituted by the second body 40, and the valve mechanism included in the check valves 210 and 220 is disposed inside the second body 40. A space included in the passage LA and positioned on the secondary side (external side) of the check valve 210 and the primary side (internal side) of the check valve 220 will be referred to below as inter-valve space S3. The check valve 210 opens when the pressure inside the internal space S1 increases due to gas produced in the internal space S1, and passes gas from the primary side thereof to the secondary side thereof, that is, to the inter-valve space S3. When the check valve 210 opens and gas produced in the internal space S1 flows into the inter-valve space S3, the pressure inside the inter-valve space S3 increases. The check valve 220 opens when the pressure inside the inter-valve space S3 thus increases, and passes gas from the primary side thereof to the secondary side thereof, that is, to the external space. The valve structure 200 seals the internal space S1 from the external space when either of the check valves 210 and 220 is closed.

When the pressure inside the internal space S1, that is, the pressure inside the space on the primary side of the check valve 210, reaches a predetermined pressure, gas that has flowed out from the internal space S1 and through the first ventilation passage LX and the third ventilation passage LZ pushes the valve body 52 to the check valve 220 side. When the valve body 52 is pushed and moves away from the valve seat 53, the check valve 210 opens due to the spring 51 deforming and the valve body 52 moving to the check valve 220 side. In this open state, gas produced in the internal space S1 flows out into the inter-valve space S3 through the gap formed between the valve body 52 and the valve seat 53. In this way, when the gas in the internal space S1 is discharged to the secondary side of the check valve 210, the pressure on the internal space S1 side that pushes the valve body 52 to the check valve 220 side weakens, and the force of the spring 51 biasing the valve body 52 to the inlet 20A side increases to greater than the pressure on the internal space S1 side. As a result, the shape of the spring 51 is restored, and the check valve 210 closes again.

When the check valve 210 opens and the pressure inside the inter-valve space S3 that is included in the second vent passage LY, that is, the pressure inside the space on the primary side of the check valve 220, reaches a predetermined pressure, the gas in the inter-valve space S3 pushes the valve body 52 to the outlet 20B side. When the valve body 52 is pushed and moves away from the valve seat 53, the check valve 220 opens due to the spring 51 deforming and the valve body 52 moving to the outlet 20B side. In this open state, the gas contained in the valve inter-valve space S3 flows out toward the outlet 20B through the gap formed between the valve body 52 and the valve seat 53, and is discharged to the external space through the outlet 20B. In this way, when the gas in the inter-valve space S3 is discharged from the passage LA, the pressure on the inter-valve space S3 side that pushes the valve body 52 to the outlet 20B side weakens, and the force of the spring 51 biasing the valve body 52 to the check valve 210 side increases to greater than the pressure on the inter-valve space S3 side. As a result, the shape of the spring 51 is restored, and the check valve 220 closes again.

The check valves 210 and 220 are, in the closed state, both able to prevent air from infiltrating the internal space S1 of the container 110A from the external space. Note that, in order for air to infiltrate the internal space S1 from the external space, the air has to flow back through the plurality of check valves 210 and 220, and thus there is little chance of air infiltrating the internal space S1 in such a manner. Also, after the check valve 210 has opened once, the inter-valve space S3 is kept at a relatively high pressure at least comparable to the atmospheric pressure, and thus there is little chance of air infiltrating the inter-valve space S3 from the external space. Accordingly, the valve structure 200 is able to effectively prevent air from infiltrating the internal space S1 with the check valves 210 and 220 that are disposed in multiple stages along the passage LA, and to prevent degradation of the power storage device element 120 caused by moisture or the like contained in the air.

Even when the check valves 210 and 220 are open, there is little chance of air infiltrating the internal space S1. This is because, in the open state, the primary side of both the check valves 210 and 220 is maintained at a pressure higher than or comparable to the pressure on the secondary side.

The valve opening pressure of the check valves 210 and 220 can be set as appropriate, and the valve opening pressure of the check valve 210 may be any of (i) equal to the valve opening pressure of the check valve 220, (ii) lower than the opening pressure of the check valve 220, or (iii) higher than the opening pressure of the check valve 220, although for the following reasons (i) and (ii) are preferable. In the case of (ii), the pressure inside the internal space S1 can be maintained higher, and thus the pressure difference between the internal space S1 and the external space prevents the air of the external space from infiltrating the internal space S1 more effectively. In the case of (i), manufacturing of the check valves 210 and 220 is facilitated, while still maintaining a relatively high pressure inside the internal space S1, and there is, for example, the advantage of not getting the check valves 210 and 220 mixed up. For example, the valve opening pressures of the check valves 210 and 220 can both be set to 0.05 MPa. Note that the valve opening pressure of the valve structure 200 as a whole is the sum of the valve opening pressures of the check valves 210 and 220, and is thus 0.1 MPa in this example. The valve opening pressure is the pressure difference between the pressure on the primary side and the pressure on the secondary side.

The inter-valve space S3 is preferably filled with gas to a higher pressure than atmospheric pressure, prior to or immediately after attaching the valve structure 200 to the container 110A. In this case, the inter-valve space S3 is kept at a higher pressure than atmospheric pressure, from immediately after the power storage device 100 is manufactured, that is, from before the check valve 210 is first opened. Thus, infiltration of air from the external space into the inter-valve space S3 and, consequently, into the internal space S1 is more effectively prevented. Note that, in the case where a valve opening inspection of the check valves 210 and 220 is performed with the primary side of the check valve 210 set to a high pressure, after manufacturing the valve structure 200, this inspection can also serve as a step for filling the inter-valve space S3 with gas. Also, the gas with which the inter-valve space S3 is filled is preferably an inert gas such as argon. In the case where the inter-valve space S3 is filled with gas for the purpose of the valve opening inspection of the check valves 210 and 220, the valve opening inspection need only be performed using an inert gas. In this case, degradation of the power storage device element 120 due to gas slightly infiltrating the internal space S1 is also prevented.

The liquid 70 is disposed to come in contact with the valve body 52 and valve seat 53 of the check valve 210, in order to suppress infiltration of moisture into the internal space S1 (see FIG. 1). The specific mode of disposition of the liquid 70 is freely selectable, as long as the liquid 70 comes in contact with the valve body 52 and the valve seat 53. In the present embodiment, a predetermined range of the inter-valve space S3 is filled with the liquid 70. The inter-valve space S3 may be filled with the liquid 70 prior to assembling the check valve 210 and the check valve 220, or may be filled through the inlet after assembling the check valve 210 and the check valve 220, for example. Also, the inter-valve space S3 may be filled with the liquid 70 through the outlet 20B, prior to disposing the spring 51 and the valve body 52 of the check valve 220. Note that the liquid 70 need only at least adhere to the portion of the surface of the valve body 52 that comes in contact with the valve seat 53 and the portion of the surface of the valve seat 53 that comes in contact with the valve body 52, when the check valve 210 is closed. Such a mode of disposition of the liquid 70 can be formed by injecting air through the inlet 20A to dispel the liquid 70 in the state shown in FIG. 10, for example.

According to the present embodiment, with the check valve 50 open, gas produced in the internal space S1 (see FIG. 1) flows out through the gap formed between the valve body 52 and the valve seat 53. The outflowing gas passes through the liquid 70 in the form of bubbles, and then flows out toward the outlet 20B after passing through the liquid 70. On the other hand, if air and moisture or the like contained in the air infiltrate the valve structure 200 through the outlet 20B, the liquid 70 prevents moisture or the like from infiltrating further to the internal side of the container 110A than the check valve 210. Infiltration of air and moisture or the like contained in the air into the container 110A is thus suppressed.

3. Variations

The above embodiments are illustrative examples of forms that can be taken by the valve structure for a power storage device and the power storage device relating to the present invention and are not intended to restrict the forms thereof. The valve structure for a power storage device and the power storage device relating to the present invention can take different forms from the forms illustrated in the embodiments. One example is a form in which some of the configuration of the embodiments is replaced, modified or omitted, or a form in which configuration is newly added to the embodiments. A number of examples of variations of the embodiments will be shown below. Note that the gist of the following variations is similarly applicable to the second embodiment in addition to the first embodiment.

[3-1] The configuration of the check valve 50 is not limited to that shown in the embodiments, and can be freely modified. For example, the check valve 50 is not limited to being a ball spring check valve, and can be constituted as a check valve of another form capable of repeatedly venting gas, such as poppet check valve, a duckbill check valve, an umbrella check valve, and a diaphragm check valve.

[3-2] In the second embodiment, instead of the check valve 210 or the check valve 220, a breaker valve capable of one-time venting of gas, that is, a breaker valve configured to split open when the internal pressure of the container 110A increases due to gas produced inside the container 110A may be used. In this variation, a breaker valve is preferably used instead of the check valve 220, when filling the liquid 70 through the inlet 20A is taken into consideration.

Figure 12:
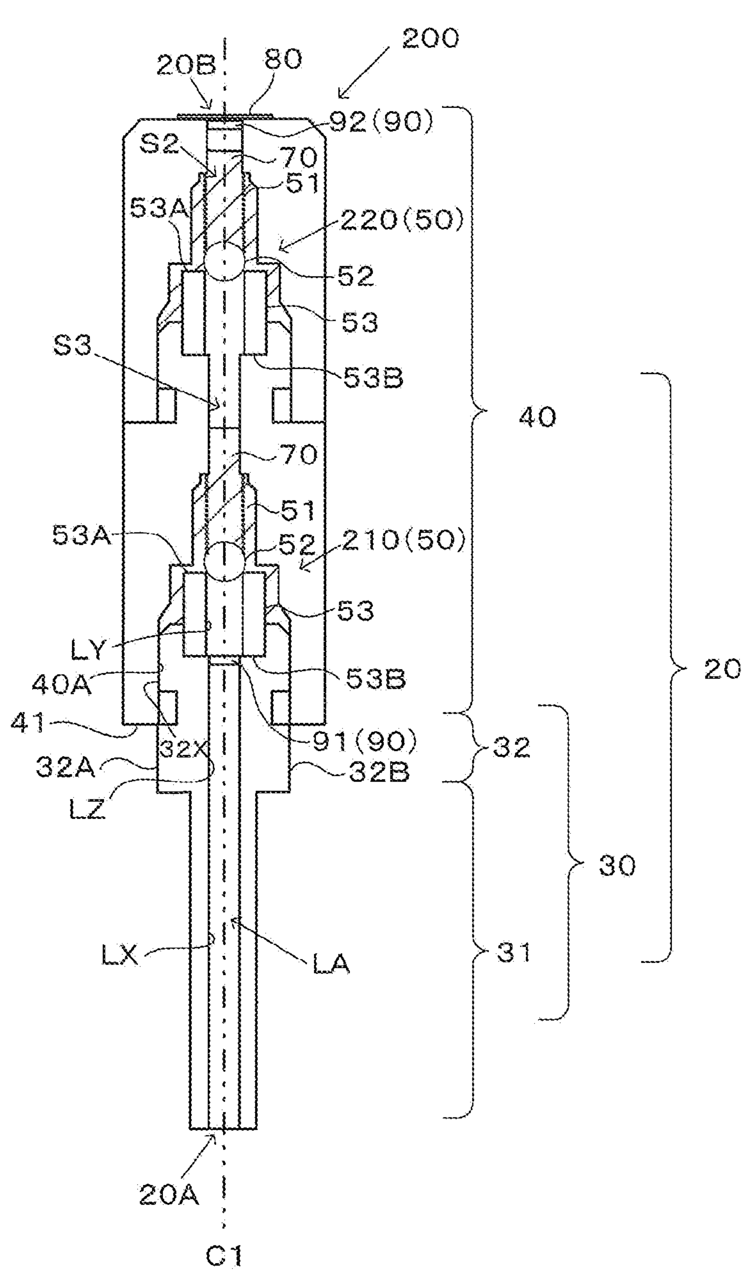
FIG. 12 is a cross-sectional view of a valve structure of another variation.

[3-3] In the second embodiment, the liquid 70 may be disposed to come in contact with the valve body 52 and valve seat 53 of the check valve 220, as shown in FIG. 12. The specific mode of disposition of the liquid 70 is freely selectable, as long as the liquid 70 comes in contact with the valve body 52 and valve seat 53 of the check valve 220. In this variation, a predetermined range of the housing space S2 is filled with the liquid 70. In this variation, the liquid 70 that is disposed to come in contact with the valve body 52 and valve seat 53 of the check valve 210 can also be omitted.

[3-4] In the second embodiment shown in FIG. 10 and the variation of the second embodiment shown in FIG. 12, the first lid 91 may be disposed on the primary side of the check valve 220 and upward of the surface of the liquid 70 that comes in contact with the valve body 52 and valve seat 53 of the check valve 210. According to this variation, opening of the check valve 220 is suppressed by the liquid that comes in contact with the valve body 52 and valve seat 53 of the check valve 210 and the organic solvent contained in the power storage device element 120 (see FIG. 2).

[3-5] In the second embodiment, the valve structure 200 had the two check valves 210 and 220, but may have three or more check valves that are arranged along the direction in which the passage LA extends. These three or more check valves block the passage LA at different locations within the passage LA in the closed state.

Figure 13:
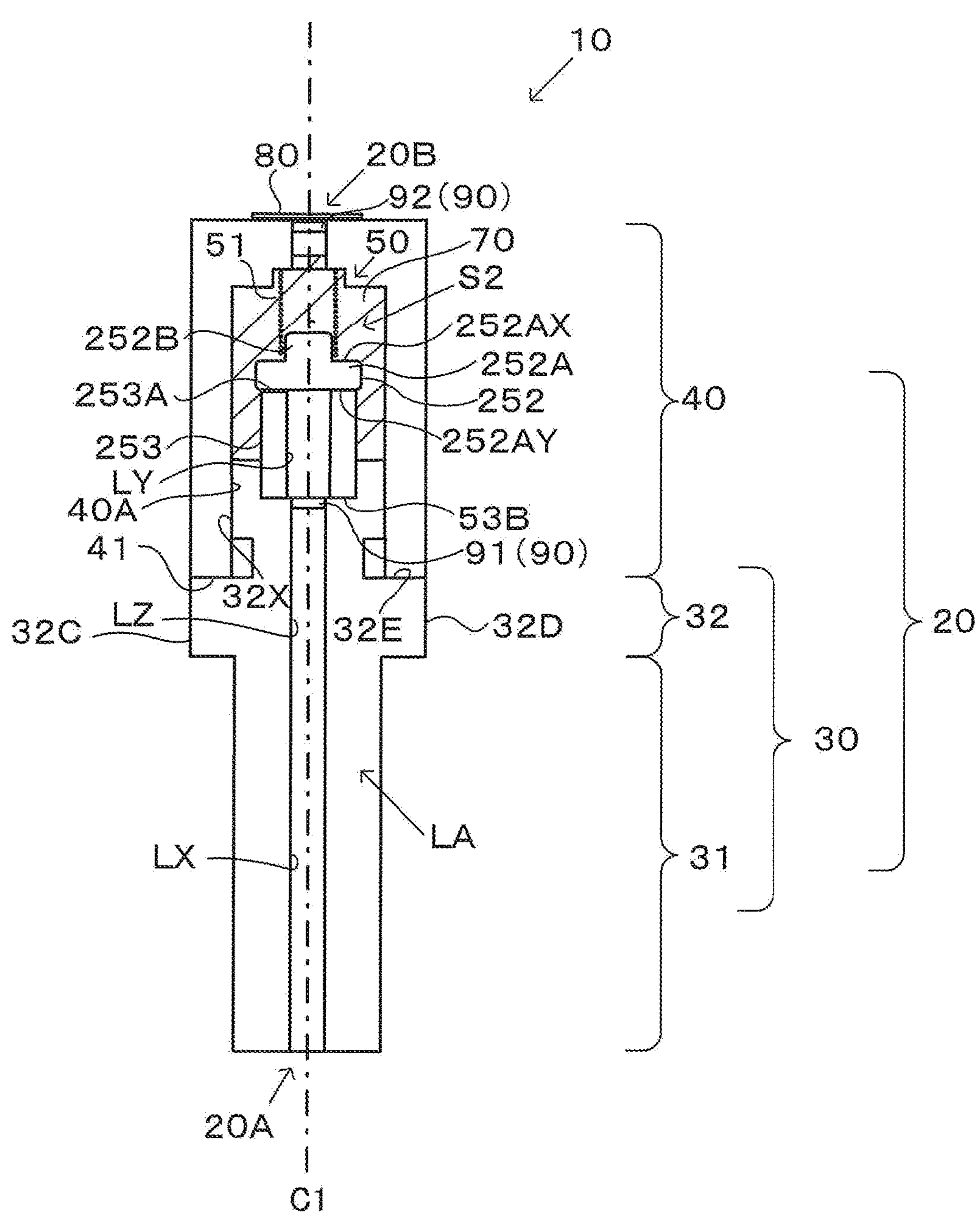
FIG. 13 is a cross-sectional view of a valve structure of yet another variation.

[3-6] The configuration of the valve body 52 is not limited to that shown in the embodiments, and is freely modifiable. FIG. 13 is a cross-sectional view of a valve structure 10 having a valve body 252 of a variation. The valve body 252 has an inverted T-shape, and has a disc-shaped region 252A and a columnar shaft part 252B that is continuous with an end face 252AX on the front side of the disk-shaped region 252A in the front-rear direction and extends forward from a middle part of the end face 252AX. Both the disk-shaped region 252A and the shaft part 252B extend centered on the central axis C1. A bottom face 252AY, which is the end face on the rear side of the disk-shaped region 252A in the front-rear direction, is received by a top face 253A of a valve seat 253 and comes in contact with the top face 253A when a check valve 250 is closed. The shaft part 252B of the valve body 252 is inserted into the space on the inner side of the spring 51, thereby coupling the valve body 252 and the spring 51.

Figure 14:
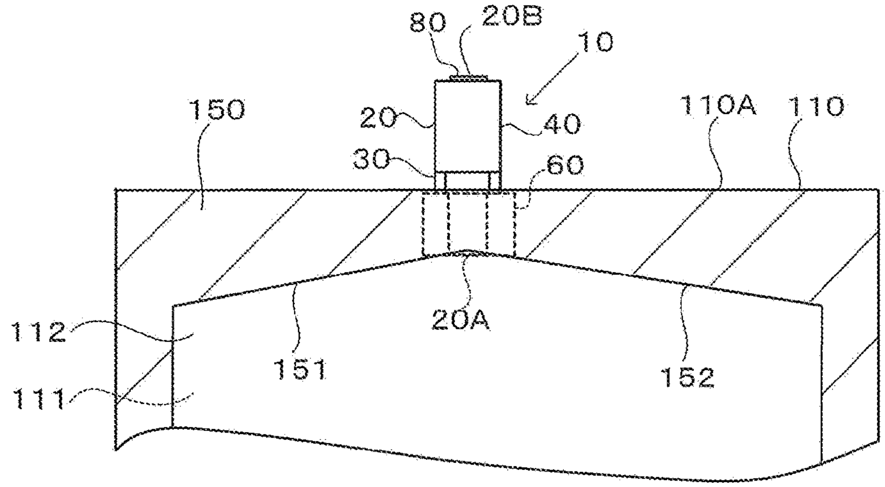
FIG. 14 is a plan view of a power storage device of a variation.
Figure 15:
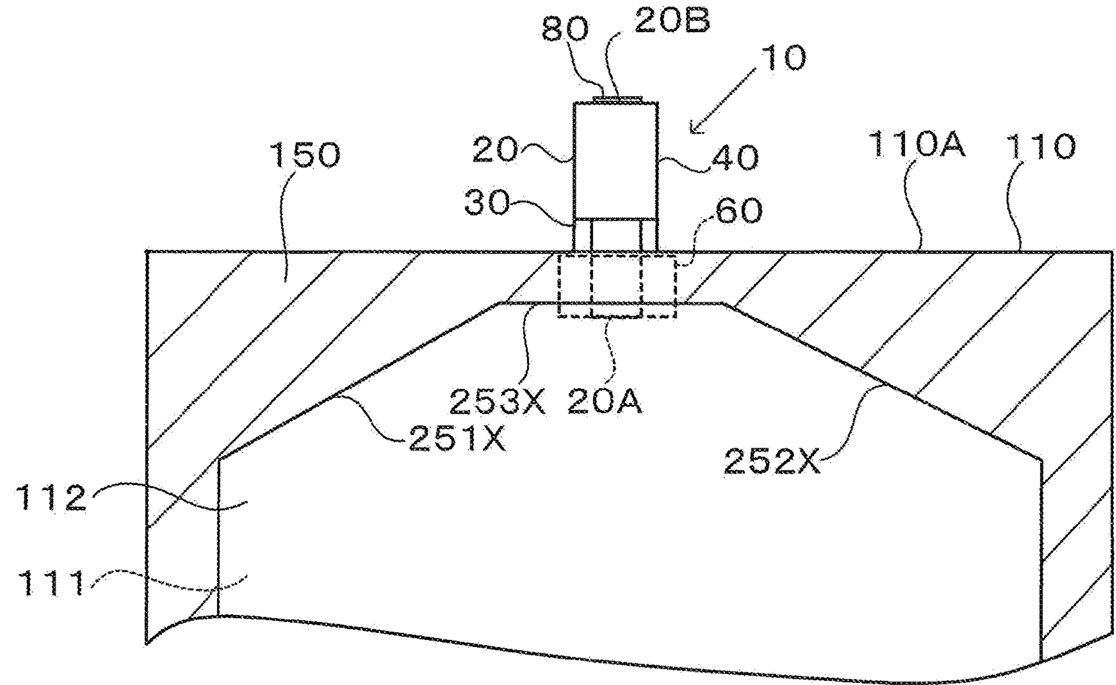
FIG. 15 is a plan view of a power storage device of another variation.
Figure 16:
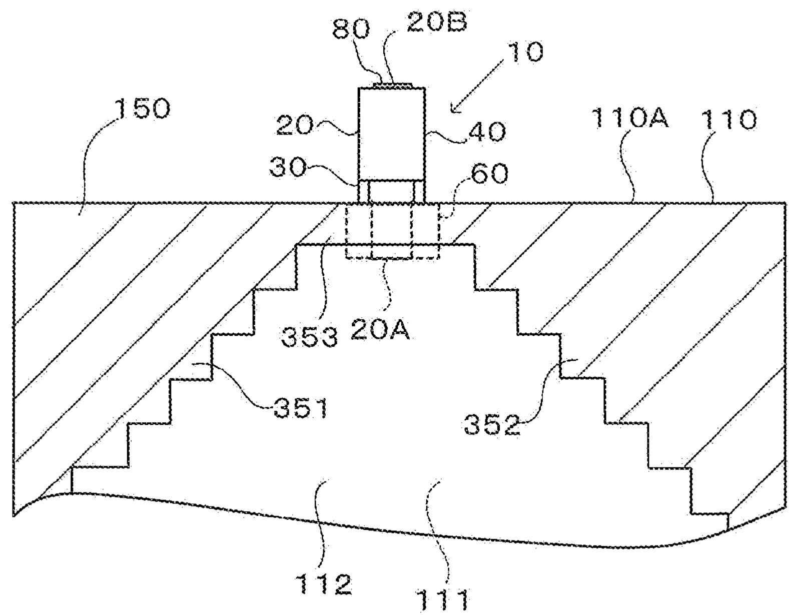
FIG. 16 is a plan view of a power storage device of yet another variation.
Figure 17:
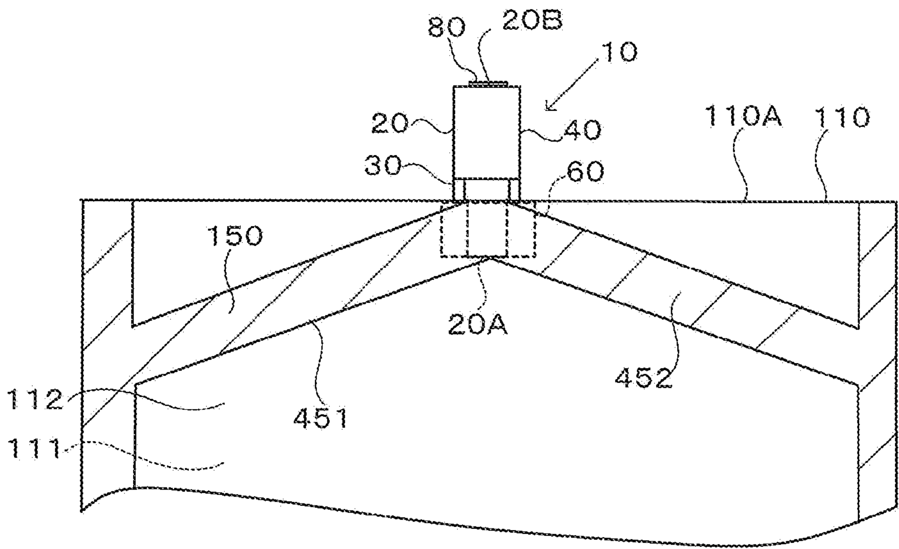
FIG. 17 is a plan view of a power storage device of yet another variation.

[3-7] The configuration of the peripheral sealing part 150 is not limited to that shown in the embodiments and is freely modifiable. As shown in FIG. 14, the peripheral sealing part 150 may have inclined sealing parts 151 and 152 whose sealing width narrows approaching the valve structure 10. As shown in FIG. 15, the peripheral sealing part 150 may have inclined sealing parts 251X and 252X that incline so as to approach a valve sealing part 253X where the valve structure 10 and the packaging materials 111 and 112 are sealed. As shown in FIG. 16, the peripheral sealing part 150 may have inclined sealing parts 351 and 352 that incline in a stepped manner so as to approach a valve sealing part 353 where the valve structure and the packaging materials 111 and 112 are sealed. As shown in FIG. 17, the peripheral sealing part 150 may have inclined sealing parts 451 and 452 that incline so as to approach the valve structure 10 and have a substantively constant sealing width. According to the variations shown in FIGS. 14 to 17, gas produced in the internal space S1 is guided toward the valve structure 10, thus enabling gas to be suitably discharged from the valve structure 10.

[3-8] The container 110A is constituted by the packaging material 111 and the packaging material 112 being heat sealed, but the container 110A may also be constituted by folding one sheet of packaging material and heat sealing a peripheral portion thereof.

[3-9] The container 110A may be constituted by packaging materials 111 and 112 such as described above, but may alternatively be a metal can, for example.

REFERENCE SIGNS LIST

10, 200 Valve structure for power storage device
20B Outlet
50 Check valve
52, 252 Valve body
53 Valve seat
70 Liquid
80 Sealing member
90 Lid
100 Power storage device
110A Container
120 Power storage device element
LA Passage

The invention claimed is:

1. A valve structure for a power storage device, comprising:
- a passage configured to communicate an interior of a container housing a power storage device element with an exterior of the container; and
- a check valve disposed to block the passage, and configured to open when an internal pressure of the container increases due to gas produced inside the container and pass the gas from an internal side of the container to an external side,
- wherein the check valve includes a valve seat and a valve body,
- the valve structure comprises a liquid disposed to come in contact with the valve seat and the valve body,
- the passage includes an outlet facing an external space, and
- the liquid forms a layer between the valve seat and the outlet such that the gas must travel through the layer to communicate an interior and an exterior of the container.

2. The valve structure for a power storage device according to claim 1,
- wherein the liquid has a melting point not higher than 10° C.

3. The valve structure for a power storage device according to claim 1, wherein the liquid has a boiling point not less than 150° C.

4. The valve structure for a power storage device according to claim 1, wherein the liquid includes liquid paraffin.

5. The valve structure for a power storage device according to claim 1,
- wherein the liquid has a viscosity in a range of 0.1 mPa·s to 2000 mPa·s.

6. The valve structure for a power storage device according to claim 1,
- the valve structure comprises a sealing member attached to close the outlet.

7. The valve structure for a power storage device according to claim 1, comprising:
- a lid disposed at least on one of a primary side and a secondary side of the check valve and configured to permeate the gas.

8. A power storage device comprising:
- the valve structure for a power storage device according to claim 1; and
- the container to which the valve structure for a power storage device is attached.

9. The valve structure for a power storage device according to claim 2, wherein the liquid has a boiling point not less than 150° C.

10. The valve structure for a power storage device according to claim 2, wherein the liquid includes liquid paraffin.

11. The valve structure for a power storage device according to claim 3, wherein the liquid includes liquid paraffin.

12. The valve structure for a power storage device according to claim 2,
- wherein the liquid has a viscosity in a range of 0.1 mPa·s to 2000 mPa·s.

13. The valve structure for a power storage device according to claim 3,
- wherein the liquid has a viscosity in a range of 0.1 mPa·s to 2000 mPa·s.

14. The valve structure for a power storage device according to claim 4,
- wherein the liquid has a viscosity in a range of 0.1 mPa·s to 2000 mPa·s.

15. The valve structure for a power storage device according to claim 2,
- the valve structure comprises a sealing member attached to close the outlet.

16. The valve structure for a power storage device according to claim 3,
- the valve structure comprises a sealing member attached to close the outlet.

17. The valve structure for a power storage device according to claim 4, the valve structure comprises a sealing member attached to close the outlet.

18. The valve structure for a power storage device according to claim 5, the valve structure comprises a sealing member attached to close the outlet.

19. The valve structure for a power storage device according to claim 2, comprising:

a lid disposed at least on one of a primary side and a secondary side of the check valve and configured to permeate the gas.

20. The valve structure for a power storage device according to claim 3, comprising:

a lid disposed at least on one of a primary side and a secondary side of the check valve and configured to permeate the gas.

* * * * *